United States Patent Office 3,598,779
Patented Aug. 10, 1971

3,598,779
POLYVINYL COMPOUNDS WITH GRAFTS OF SULFOPROPYL AND ACRYLONITRILE RESIDUES USED TO IMPROVE DYEABILITY OF ACRYLIC POLYMERS
Jean-Claude Galin, Strasbourg, France, assignor to Societe Rhodiaceta, Paris, France
No Drawing. Filed Sept. 15, 1969, Ser. No. 858,162
Claims priority, application France, Sept. 17, 1968, 166,517
Int. Cl. C08f 3/34, 45/46
U.S. Cl. 260—30.8      7 Claims

ABSTRACT OF THE DISCLOSURE

Polyvinyl compounds having sulfopropyl and acrylonitrile residues grafted thereon, which are novel, may be blended with acrylonitrile polymers to improve dyeability of the latter with basic dyestuffs.

---

The invention relates to polymers derived from polyvinyl alcohol and to their preparation. By "polyvinyl alcohol" is meant a long chain synthetic polymer containing at least 98% by weight of vinyl alcohol units

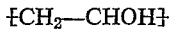

It is known to improve the affinity for basic dyestuffs and the hydrophilic and antistatic characteristics of various natural and synthetic polymers by attaching sulphonic side groups to their chain. Thus it is known to treat polyvinyl alcohol with an aldehyde carrying one or more sulphonic groups and to spin the product by itself or mixed with untreated polyvinyl alcohol.

However, this method, which is based on a conventional acetalisation reaction, does not allow high degrees of substitution to be achieved.

It is also known to cyanoethylate natural or synthetic hydroxylic polymers, including polyvinyl alcohol, by reacting acrylonitrile with these polymers in the presence of an aqueous alkaline solution as catalyst. However, this process requires the use of a very much larger amount of acrylonitrile than the amount which it is desired to attach, and the products obtained are generally intensely coloured, which makes them unsuitable for certain uses.

The present invention provides new macromolecular compounds having, for a randomly chosen sequence of 100 monomer units, the formula:

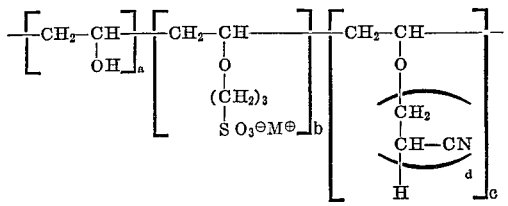

in which $a$, $b$, $c$, $d$ are positive numbers so that $a < b \leqslant 80$, $c > o$, $d \geqslant 1$ $a+b+c=100$, M is a hydrogen atom or an alkali metal atom such as sodium, potassium or lithium, the indicated monomer units may be in any order, and, when $d$ is greater than 1, the acrylonitrile graft may be partially branched and/or cyclised.

These macromolecular compounds are prepared, in accordance with a feature of the invention, by reacting polyvinyl alcohol in an aprotic solvent, preferably in homogeneous solution in dimethylsulphoxide, and under an inert atmosphere, first with a metalating agent, then with 1,3-propanesultone and with acrylonitrile.

Any metalating agent which is sufficiently stable in the aprotic solvent can be used, for example, an alkali metal hydride or amide, such as sodium hydride or amide, a radical-ion such as naphthalene-sodium, or a carbanion such as n-butyl-lithium, diphenylmethyl-sodium, fluorenyl-lithium or dimethylsulphinyl-sodium. It is particularly advantageous to use dimethylsulphinyl-sodium, commonly called "dimsyl-sodium," which is an alkali metal derivative of dimethylsulphoxide and can optionally be formed in situ and to carry out the process in homogeneous solution in dimethylsulphoxide at ambient temperature.

The metalation reaction is quantitative and is not accompanied by any degradation of the polymer chain. The degree of metalation, which can be selected as desired, is determined solely by the ratio metalating agent/polyvinyl alcohol.

The treatment with 1,3-propanesultone of the alcoholate groups resulting from the metalation is carried out under an inert atmosphere using the sultone undiluted or dissolved in an aprotic solvent. For reasons of convenience and hence of economy, it is generally preferred to carry out the process in the same solvent as that used during the metalation. As in the preceding case, it is particularly valuable to carry out the process in a dimethylsulphoxide medium. The temperature can be between 20 and 60° C. The reaction is very rapid and the treatment requires only 15 to 30 minutes. The reaction is practically quantitative. It is thus easily possible to regulate the degree of sulphonation of the polymer as desired by the amount of 1,3-propanesultone introduced, which is entirely consumed. It is in particular possible to sulphonate only a predetermined fraction of the alcoholate groups.

The sulphonated polymer is then cyanoethylated or grafted anionically by treatment with acrylonitrile in an aprotic medium, preferably in the same medium as that used for the metalation and the sulphonation. As before, dimethylsulphoxide is the preferred solvent. The reaction is started by the alcoholate groups remaining on the sulphonated polymer and does not require the addition of any other catalyst. The acrylonitrile added is practically totally consumed and the polyacrylonitrile content of the final product, which is easily controllable, thus only depends on the amount of acrylonitrile employed.

The products thus obtained possess alkali metal sulphonate groups, which can optionally be converted into sulphonic acid groups, for example by passing them in solution over a suitable chosen ion-exchange resin.

The process of the invention produces new products by three successive operations which can be integrally carried out in a single aprotic medium without requiring the intermediate products obtained to be isolated. The yields of these reactions are very high, of the order of 90%.

The properties of the new macromolecular compounds of the invention vary in accordance with the relative proportions of their various constituent units. In general they have good affinity for basic dyestuffs, good hydrophilic and antistatic characteristics and good compatibility with other polymers.

As the product $cd$ increases, the macromolecular compounds of the invention become less and less soluble in boiling water and more and more soluble in the organic solvents for polyacrylonitrile such as dimethylformamide, dimethylacetamide and N-methylpyrrolidone. Furthermore, they show satisfactory compatibility both in solution and in the solid phase with acrylic and modacrylic polymers, i.e. acrylonitrile copolymers containing at least 50% by weight of acrylonitrile units. The new macromolecular compounds can be added in small amounts (e.g. 1 to 10% by weight) to solutions, for example spinning solutions, in particular of acrylic and modacrylic polymers. The filaments or films obtained from such solutions show better dyeing affinity for basic dyestuffs than those obtained without addition of the macromolecular compounds of the invention.

The following examples illustrate the invention.

EXAMPLE 1

The whole of a solution of "dimsyl-sodium" prepared by dissolving 7.2 g. of 50% sodium hydride in oil in 150 ml. of anhydrous dimethylsulphoxide is added slowly under an argon atmosphere and with vigorous stirring to an anhydrous solution of 22 g. of polyvinyl alcohol (intrinsic viscosity, 0.740 dl./g. measured in water at 25° C.; ester number, 0.1) in 500 ml. of dimethylsulphoxide. Stirring under argon at ordinary temperature is continued for 10 minutes after the end of the addition of the "dimsyl-sodium" solution.

12.2 g. of 1,3-propanesultone dissolved in 20 ml. of anhydrous dimethylsulphoxide are added with vigorous stirring to the polyvinyl alcohol alcoholate solution thus obtained, maintaining the argon atmosphere throughout. Stirring under argon is continued for 30 minutes after the end of the addition of the 1,3-propanesultone.

When the reaction has ended, a sample is taken from the reaction medium and the polymer is precipitated therefrom by addition of the sample to acetone acidified with dilute hydrochloric acid. 3 g. of sulphonated polyvinyl alcohol are recovered, in which the average degree of sulphonation (b), determined from its sulphur content, is 18% of the hydroxyl groups of the starting polymer, corresponding to a yield of 90% for the sulphonation reaction.

31.8 g. of distilled acrylonitrile are added to the metallated and sulphonated polyvinyl alcohol solution with vigorous stirring and under an argon atmosphere, while the temperature is kept at 20° C. Stirring under argon is continued for 2 and a half hours after the end of the addition of the acrylonitrile.

After acidifying the reaction medium with dilute hydrochloric acid to a slightly acid pH, acetone is added with vigorous stirring, until a marked and persistent cloudiness results. The precipitation is continued by adding diethyl ether until the polymer separates out as a swollen and viscous phase. This phase is separated, dispersed in boiling methanol and reprecipitated by addition of a large excess of diethyl ether.

59.5 g. of a pale yellow polymer containing an average of 36.1% of acrylonitrile (the proportion being determined from the nitrogen content) are collected. This polymer can easily be fractionated by partial dissolution in water at 100° C. Fraction A, which is insoluble in water at 100° C., contains on average 69.1% of acrylonitrile and 1.8% of sulphur, corresponding to an acidity of 562 milliequivalents/kg. This fraction dissolves easily in the solvents generally used for spinning acrylic or modacrylic polymers such as dimethylformamide, dimethylsulphoxide and N-methyl-pyrrolidone.

Fraction B, which is soluble in water at 100° C., on average contains 16.5% of acrylonitrile and 6.25% of sulphur, corresponding to an acidity of 1953 milliequivalents per kg. This fraction is soluble in dimethylsulphoxide.

Films are cast from a solution containing a modacrylic polymer based on acrylonitrile and vinylidene chloride and containing 64 acid milliequivalents per kg. of polymer, to which various amounts of polymer from Fraction A have been added. The homogeneous films obtained are dyed with the dyestuff CI Basic Blue 71 (Colour Index, 2nd edition). Table I indicates how the percentage by weight of dyestuff fixed, relative to the weight of the undyed film, varies as a function of the content of Fraction A.

TABLE I

| Percentage of Fraction A in the polymer mixture | 0 | 5 | 10 |
|---|---|---|---|
| Percentage of dyestuff fixed | 0.21 | 1.6 | 3 |

EXAMPLES 2 TO 7

The same polyvinyl alcohol as that used in Example 1 is treated in accordance with the process described in that example, but using different amounts of reagents. The amounts of reagents used, expressed in grams, as well as the yields of the reactions carried out and the principal characteristics of the polymers obtained, are indicated in Table II.

TABLE II

| Example | 2 | 3 | 4 | 5 | 6 | 7 |
|---|---|---|---|---|---|---|
| Polyvinyl alcohol, weight in g | 22 | 22 | 22 | 22 | 22 | 22 |
| Desired degree of sulphonation, percent | 20 | 20 | 20 | 20 | 10 | 30 |
| 50% strength sodium hydride in oil, weight in g | 7.2 | 7.2 | 7.2 | 7.2 | 4.8 | 9.6 |
| 1,3-propanesultone, weight in g | 12.2 | 12.2 | 12.2 | 12.2 | 6.1 | 18.3 |
| Sample, weight in g | 2.6 | 0 | 3.4 | 2 | 2 | 2.5 |
| Sulphonation yield, percent | 83.6 | | 91.0 | 87.6 | | |
| Acrylonitrile, weight in g | 10.6 | 15.9 | 21.2 | 42.4 | 23.8 | 18.5 |
| Sulphonated and cyanoethylated polymer obtained, weight in g | 41 | 48 | 49 | 86 | 48 | 59 |

The polymer prepared by the process described by Example 2 can easily be fractionated by selective dissolution in acetone. The fraction which is insoluble in acetone (85.4% by weight) contains 7.20% by weight of sulphur and 0.73% by weight of nitrogen, corresponding to a percentage of fixed polyacrylonitrile of 2.76% of the weight of the polymer obtained.

The fraction which is soluble in acetone (14.6% by weight) contains 2.20% by weight of sulphur and 23.8% by weight of nitrogen, corresponding to a percentage of fixed acrylonitrile of 90.3 of the weight of the polymer.

Equally, the polymers prepared according to the processes described in Examples 3, 4, 5, 6 and 7 can easily be fractionated by selective dissolution in water at 100° C., into an acetone-insoluble fraction A and an acetone-soluble fraction B.

Table III gives the properties of the various fractions obtained.

TABLE III

| | Example | | | | | | | |
|---|---|---|---|---|---|---|---|---|
| | 3 | | 5 | | 6 | | 7 | |
| | A | B | A | B | A | B | A | B |
| Proportions of A and B, in percent | 21.6 | 78.4 | 45.4 | 54.6 | 2.3 | 97.7 | 6.5 | 93.5 |
| Sulphur content, in percent | 1.35 | 7.50 | 0.75 | 6.80 | | 3.60 | 3.45 | 7.55 |
| Acidity, in milliequivalents/kg | 422 | 2,365 | 234 | 2,125 | | 1,125 | 1,078 | 2,359 |
| Nitrogen content, in percent | 18.65 | 0.5 | 22.40 | 1.95 | | 8.80 | 15.0 | 6.0 |
| Polyacrylonitrile content, percent | 70.60 | 1.89 | 84.80 | 7.38 | | 33.26 | 56.70 | 22.68 |

The solubility of these polymers depends on their composition. All the polymers have a slight yellow colour.

The A fractions, which are insoluble in boiling water, are soluble in solvents for acrylic and modacrylic polymers such as dimethylsulphoxide, dimethylformamide and N-methylpyrrolidone. For example, fraction A of Example 5, when mixed at the rate of 5% with the modacrylic polymer used in Example 1, yields a perfectly homogeneous solution in dimethylsulphoxide which gives an equally homogeneous film. When dyed with the dyestuff CI Basic Blue 71 (Colour Index 2nd edition), this film fixes 1.1% of dyestuff as against 0.21% for the film obtained from the pure modacrylic polymer.

I claim:
1. A macromolecular compound having, for a randomly chosen sequence of 100 monomer units, the formula:

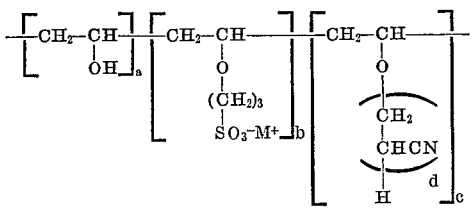

in which $a$, $b$, $c$, $d$ are positive numbers so that $0 < b \leq 80$, $c > 0$, $d \geq 1$, $a+b+c=100$, M is a hydrogen or alkali metal atom, the indicated monomer units may be in any order, and, when $d$ is greater than one, the chain of acrylonitrile units may be partially branched and/or cyclized.

2. Process for the production of a macromolecular compound having, for a randomly chosen sequence of 100 monomer units the formula:

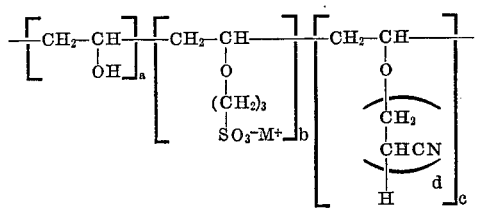

in which $a$, $b$, $c$, $d$ are positive numbers so that $0 < b \leq 80$, $c > 0$, $d \geq 1$, $a+b+c=100$, M is a hydrogen or alkali metal atom, the indicated monomer units may be in any order, and, when $d$ is greater than one, the chain of acrylonitrile units may be partially branched and/or cyclized, which comprises reacting polyvinyl alcohol in an aprotic solvent first with a metalating agent and then with 1,3-propanesultone and with acrylonitrile, and optionally converting the metal sulphonate groups to acid groups.

3. Process according to claim 2 in which the metalating agent is an alkali metal hydride, amide, radical-ion, or carbanion.

4. Process according to claim 3 in which the metalating agent is dimethyl-sulphinyl-sodium.

5. Process according to claim 2 in which the aprotic solvent is dimethylsulphoxide.

6. A homogeneous mixture of an acrylic or modacrylic polymer with a macromolecular compound having, for a randomly chosen sequence of 100 monomer units, the formula:

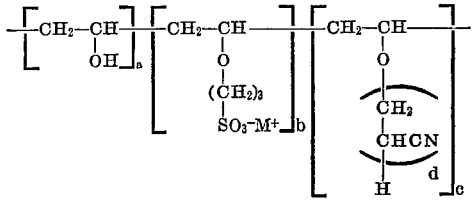

in which $a$, $b$, $c$, $d$ are positive numbers so that $0 < b \leq 80$, $c > 0$, $d \geq 1$, $a+b+c=100$, M is a hydrogen or alkali metal atom, the indicated monomer units may be in any order, and, when $d$ is greater than one, the chain of acrylonitrile units may be partially branched and/or cyclised.

7. A mixture as claimed in claim 6 dyed with a basic dyestuff.

References Cited
UNITED STATES PATENTS

| | | | |
|---|---|---|---|
| 2,977,183 | 4/1961 | Osugi et al. | 18—54 |
| 2,992,204 | 7/1961 | Tetsuro et al. | 260—45.5 |
| 3,492,080 | 1/1970 | Tesoro | 8—15.7 |

MORRIS LIEBMAN, Primary Examiner

R. ZAITLEN, Assistant Examiner

U.S. Cl. X.R.

260—32.6, 37, 91.3